(No Model.) 2 Sheets—Sheet 1.
J. A. RITTER, Jr.
CUTTING APPARATUS FOR HARVESTERS.
No. 315,341. Patented Apr. 7, 1885.
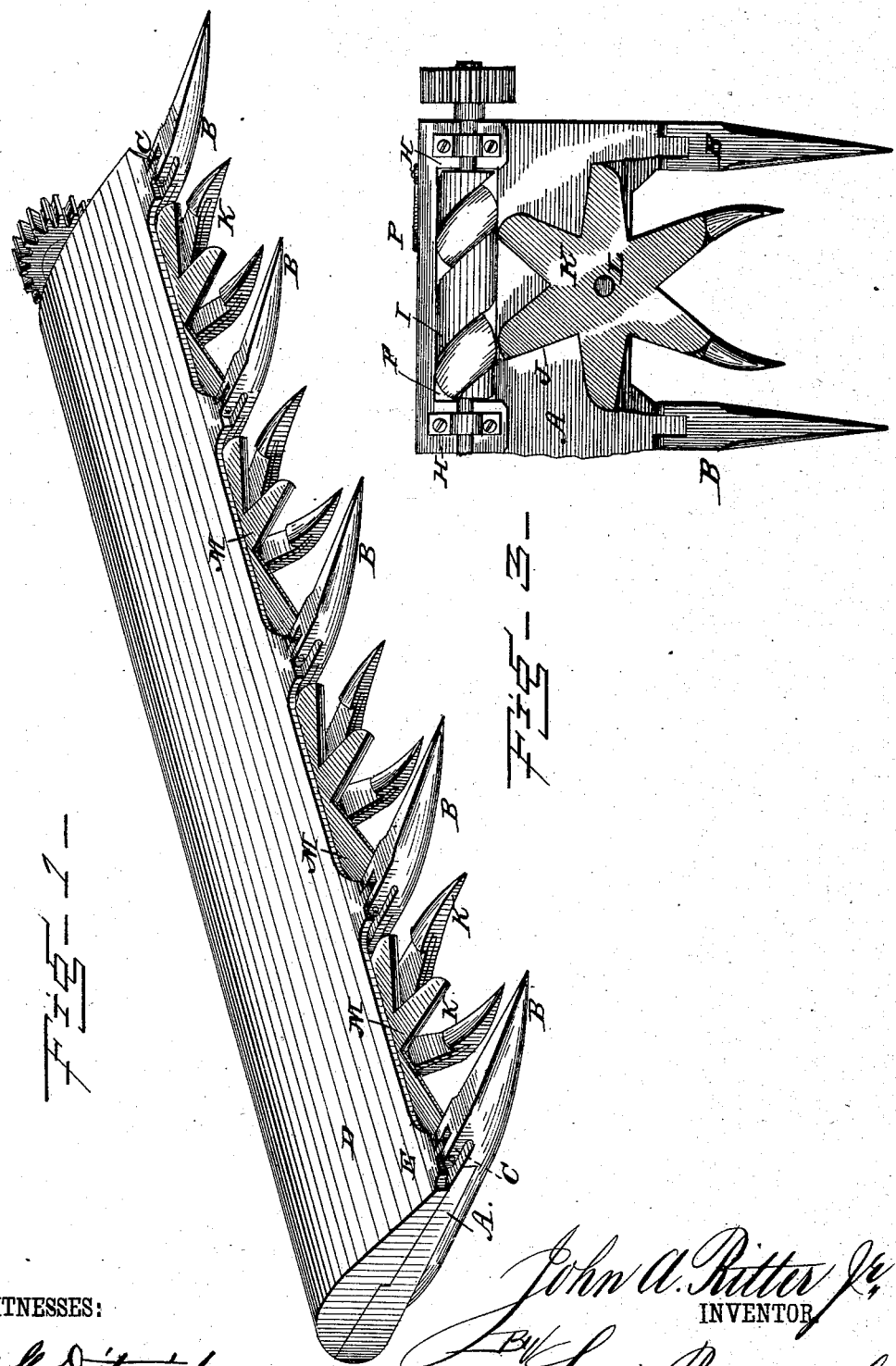

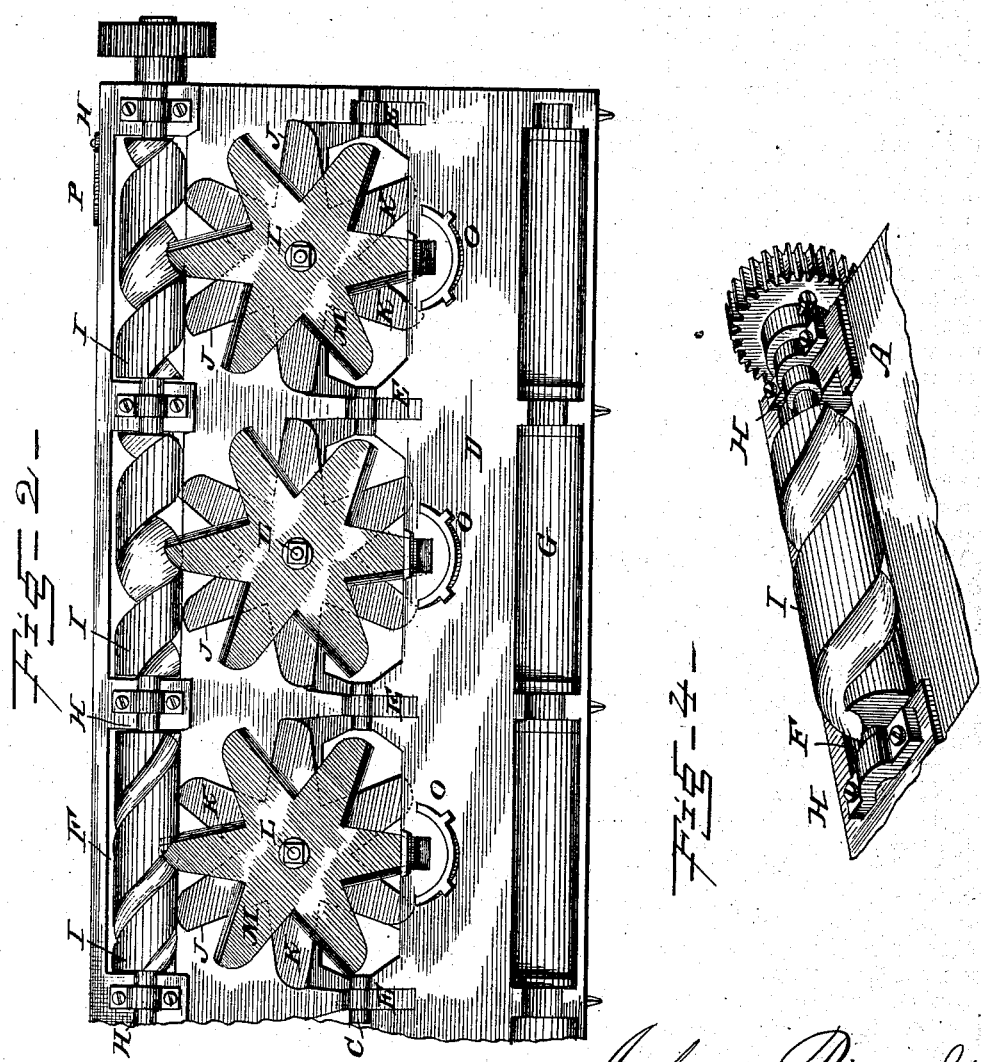

UNITED STATES PATENT OFFICE.

JOHN A. RITTER, JR., OF WEST BADEN, INDIANA.

CUTTING APPARATUS FOR HARVESTERS.

SPECIFICATION forming part of Letters Patent No. 315,341, dated April 7, 1885.

Application filed February 23, 1884. (No model.)

*To all whom it may concern:*

Be it known that I, JOHN A. RITTER, Jr., of West Baden, in the county of Orange and State of Indiana, have invented certain new and useful Improvements in Cutting Apparatus for Harvesters; and I do hereby declare that the following is a full, clear, and exact description of the invention, which will enable others skilled in the art to which it appertains to make and use the same, reference being had to the accompanying drawings, which form a part of this specification, and in which—

Figure 1 is a perspective view of my improved cutting apparatus for harvesters. Fig. 2 is a top view of the same with the covering-plate swung back. Fig. 3 is a similar view showing the covering-plate and the revolving cutters removed, and Fig. 4 is a detail view of the spiral shaft.

Similar letters of reference indicate corresponding parts in all the figures.

My invention has relation to harvester-cutters having revolving cutters; and it consists in the improved construction and combination of parts of the same, as hereinafter more fully described and claimed.

In the accompanying drawings, the letter A indicates the finger-bar, the forward edge of which is provided with fingers or fenders B of the usual shape, but forming hinge-bearings C at their inner ends instead of slots, as in finger-bars having reciprocating cutters, and the forward edge of a covering-plate, D, is hinged in these hinge-bearings with its projecting perforated lugs E. The finger-bar forms at its rear edge a longitudinal groove or recess, F, and the covering-plate has a corresponding groove, G, and the groove in the finger-bar forms longitudinal bearings H for a spirally grooved or twisted shaft, I, which receives revolving motion from suitable connection with the gearing of the machine. Between the forwardly-projecting fingers or fenders the upper side of the finger-bar is provided with recesses J, corresponding in shape to the inner halves of the star-shaped stationary cutters K, which are fitted upon central pivots or screws, L, the upper ends of which form pivots upon which the rotating cutters M are pivoted. The rotating or revolving cutters are star-shaped and of the same size and shape as the stationary cutters, and have the edges facing in the direction of their rotation sharpened, and the ends or arms of the stationary cutters which project beyond the forward edge of the finger-bar are protected by correspondingly-shaped fenders or fingers N, projecting between the larger fingers. The inner arms of the revolving cutters engage between the spiral flanges of the revolving spiral shaft, and it will be seen that as the shaft is revolved the flanges will bear against the blunt edges of the cutters, forcing them to revolve. In this manner it will be seen that the grass or grain coming in front of the revolving cutters will be cut by the arms of the revolving cutters meeting with their edges the edges of the stationary cutters, and it will also be seen that when the fingers or arms of the stationary cutters which project forward are worn the cutters may be raised off their pivots and revolved, bringing other arms forward, thus saving the time consumed in sharpening them while the harvester is in use. The pitch of the spiral grooves may, if desired, be made such that while one edge of the spiral groove bears against the blunt edges of the arms of the revolving cutters the other edge of the groove may draw upward upon the sharpened edges in an angle of the same pitch as the angle of the edge, sharpening it while revolving the cutter. A segment, O, of soft metal may be inserted in the under side of the hinged cover over the center of the revolving cutters, bearing against their upper surface and keeping them revolving true, and the rear edge of the said cover may be provided with hooks P or similar suitable means for holding it down upon the finger-bar.

Having thus described my invention, I claim and desire to secure by Letters Patent of the United States—

1. The combination of a finger-bar in a harvester having recesses in its upper side of the shape of a half-star, stationary cutters of star shape secured in the said recesses and having some of their arms projecting beyond the forward edge of the bar, rotary cutters pivoted concentric with the stationary cutters and corresponding in size and shape to the same, and a cover hinged over the top of the finger-bar and over the cutters, as and for the purpose shown and set forth.

2. In a harvester, the combination of the finger-bar having fingers upon its forward edge and half-star-shaped recesses in its upper side, star-shaped stationary cutters, star-shaped revolving cutters, a spirally-grooved shaft revolving in the rear of the finger-bar, and a cover hinged over the top of the finger-bar and the cutters, as and for the purpose shown and set forth.

In testimony that I claim the foregoing as my own I have hereunto affixed my signature in presence of two witnesses.

JOHN A. RITTER, JR.

Witnesses:
JAMES K. RITTER,
JOHN DIXON.